United States Patent [19]

Schull

[11] Patent Number: 5,535,267
[45] Date of Patent: Jul. 9, 1996

[54] TELEMETRY SYSTEM WITH IMPROVED VERIFICATION OF TELEMETRY INTERFACE UNIT INSTALLATION

[75] Inventor: Jerome W. Schull, Marietta, Ga.

[73] Assignee: BellSouth Corporation, Atlanta, Ga.

[21] Appl. No.: 231,282

[22] Filed: Apr. 22, 1994

[51] Int. Cl.⁶ .................................................. H04M 11/00
[52] U.S. Cl. .............................. 379/106; 379/107; 379/34
[58] Field of Search ................................ 379/106, 107, 379/10, 18, 27– 29, 34, 37, 49

[56] References Cited

U.S. PATENT DOCUMENTS

| 4,578,536 | 3/1986 | Oliver et al. | |
| 4,710,919 | 12/1987 | Oliver et al. | 370/96 |
| 4,724,435 | 2/1988 | Moses et al. | 340/870.130 |
| 4,774,721 | 9/1988 | Gift et al. | 379/10 |
| 5,128,988 | 7/1992 | Cowell et al. | 379/106 |
| 5,189,694 | 2/1993 | Garland | 379/106 |
| 5,204,896 | 4/1993 | Oliver | 379/106 |
| 5,243,644 | 9/1993 | Garland et al. | 379/106 |
| 5,359,641 | 10/1994 | Schull et al. | 379/106 |
| 5,394,461 | 2/1995 | Garland | 379/106 |

Primary Examiner—Wing F. Chan
Attorney, Agent, or Firm—Robin, Blecker, Daley & Driscoll

[57] ABSTRACT

A telemetry system in which a telephone system of the telemetry system is adapted to provide automatic identification of the telephone number of a subscriber location at which a telemetry interface unit is installed and to utilize the identified telephone number in a procedure for verifying the installation. The telephone system is adapted to respond to a preselected telephone number which results in identification of the subscriber location telephone number and which includes a utility identifier which can be used to access utility information for the verification procedure.

52 Claims, 3 Drawing Sheets 5,535,267

TELEMETRY SYSTEM WITH IMPROVED VERIFICATION OF TELEMETRY INTERFACE UNIT INSTALLATION

BACKGROUND OF THE INVENTION

This invention relates to telephone systems and, in particular, to telephone systems adapted to provide telemetering of equipment at a subscriber's location.

Telemetry systems are known in the art in which entities, particularly, utility companies, are provided access over the public switched telephone network ("PSTN") to entity equipment (e.g., utility meters) at a subscriber location for the purpose of monitoring and accessing this equipment. In a telemetry system, a telemetry interface unit ("TIU") is provided at the subscriber location and attached to the subscriber loop of the telephone system and to the equipment to be monitored or accessed.

The telephone system is then adapted such that it can communicate messages to and from the TIU. This communication process is initiated by an alert message sent by the telephone system to the TIU. The TIU responds to the alert message with an acknowledgement message which may include a preselected telemetry interface unit identifier ("TIUID"). The acknowledgement message indicates that the TIU is in circuit with the telephone system and is ready to conduct an equipment read or control, as the case may be.

Telemetry systems of this type have recently been proposed in which the telephone system is configured so that the messages between the system and TIU are communicated over the normal switch fabric without ringing occurring at the subscriber location. In this type of telemetry system, the telephone system is provided with a central office service unit ("COSU") which communicates with the monitoring entity. The COSU then controls the switching network in the telephone system in response to requests made by the monitoring entity. This control is effected so that a TIU at a subscriber location is brought into the telephone system with ringing suppressed. Accordingly, the telephone equipment at the subscriber location does not ring and operation of the telemetry system does not create a disturbance at the subscriber location. Systems of this type are disclosed, for example, in U.S. Pat. Nos. 5,189,694 and 5,243,644.

An improved telemetry system using suppressed ringing is described in U.S. patent application Ser. No. 07/995,031, filed Dec. 22, 1992, and assigned to the same assignee hereof. In the telemetry system of the '031 application, the telephone system is adapted to further include control routines which automatically account for different subscriber loop types in making the suppressed ringing connections and which generate telemetry system information by correlating certain monitoring entity and telephone system data based on TIUID information. In the system of this application, the computer of the monitoring entity interfaces with a telemetry network access computer ("TNAC") of the telephone system which, in turn, provides control of the COSU to carry out the control routines.

In the above telemetry systems, when equipment at a subscriber location is to be brought into the telemetry system, an installer is dispatched to the subscriber location to install a TIU and to connect it into the telephone system and to the equipment to be monitored or controlled. To verify that this connection has been satisfactorily completed, the installer must place a call to the monitoring entity and request that the entity computer carry out an "install" or "initial" read. The entity computer will then, using the procedures outlined above, initiate an initial read through the telephone system. If this initial read is satisfactory, the installer is advised that the installation has been verified. The installer can then proceed to the next installation.

In order to initiate the above verification procedure, the monitoring entity must know or be given the telephone number of the subscriber location. Often this information is not available to the installer requesting the initial read. The installer must then try to locate the number and, if the number cannot be located, may have to dispense with the verification procedure and return to the subscriber location on another day. This often delays the installation and is a waste of manpower and time.

It is, therefore, a primary object of the present invention to provide a telemetry system in which the procedure for verifying installation of a TIU at a subscriber location is improved.

It is a further object of the present invention to provide a telemetry system in which the procedure for verifying installation of TIU at a subscriber location is simplified for the installer.

SUMMARY OF THE INVENTION

In accordance with the principles of the present invention, the above and other objects are realized in a telemetry system of the above-type by further adapting the telephone system so that it automatically identifies the telephone number of the subscriber location at which a TIU is being installed and so that the identified telephone number is used by the telephone system in verifying the installation of the TIU at the subscriber location. More particularly, the telephone system of the invention is configured to provide such identification of the subscriber location telephone number and to automatically institute the verification procedure in response to the dialing at the subscriber location of a preselected telephone number containing a monitoring entity identifier associated with the monitoring entity installing the TIU.

In response to the dialing of this preselected telephone number, the telephone system provides an acknowledgement signal to the subscriber location which is an instruction for the location to go on-hook. The telephone system also automatically identifies the subscriber location telephone number and from the dialed preselected telephone number derives the monitoring entity identifier. From the latter identifier, the telephone system retrieves a partial TIUID (e.g., a TIUID prefix) which is used as a part of (e.g., as a prefix of) or included in the TIUIDs used by the monitoring entity to identify its TIUs. The telephone system also retrieves a TIU transmission type and a TIU alert type also based on the identifier.

The telephone system, based on the identified subscriber location telephone number and the retrieved TIU transmission and alert types, then sends a message to the TIU at the subscriber location requesting that the TIU transmit a message including its TIUID. The telephone system, upon receipt of the message with the TIUID, then correlates a part (e.g., a prefix) of the received TIUID with the previously retrieved partial TIUID (e.g., a TIUID prefix) to determine whether there is a match. Upon a match being found, the telephone system transmits a confirmation message to the subscriber location to indicate that the installation has been verified.

The telephone system of invention is further adapted such that the preselected telephone number can be dialed at multiple subscriber locations served by the telephone system and the monitoring entity to verify installation of the TIUs of the entity. As a result, automatic verification of TIU installation at various subscriber locations served by an entity can be carried out easily and simply without knowledge of the telephone number of the subscriber locations by the installer or the monitoring entity.

In the embodiment of the invention to be disclosed hereinafter, a COSU is provided in the telephone system. Calls to the preselected telephone number are directed by the switching network of the telephone system to the COSU along with the preselected telephone number and the identified subscriber location telephone number. A control computer interfaces with the COSU and is passed the preselected telephone number and the identified subscriber location telephone number as a verification request. In response thereto, the control computer issues to the COSU a verification command and, if desired, an access or initial read command (request).

Upon receiving the verification command, the COSU controls the switching network to send a message to the TIU requesting the TIU to transmit its TIUID. Upon receipt of the message containing the TIUID, the COSU then compares a part (e.g. the prefix) of the received TIUID with the partial TIUD (e.g., prefix TIUID) for the monitoring entity. If a match is found, a successful status code is sent to the control computer and a response to the verification message is sent to the subscriber location. If the response to the verification command was accompanied by an initial read, the initial read is also sent from the COSU to the control computer.

In one form of the invention, the control computer is provided by a TNAC which, in turn, communicates with the computer of the monitoring entity. In a second form of the invention, the control computer is provided by the computer of the monitoring entity itself. In the first form of the invention, the TNAC includes a data base for correlating the monitoring entity identifier in the preselected telephone number with the TIUID prefix, the TIU alert type, the TIU transmission type and the other parameters related to the monitoring entity. In the second form of the invention, the COSU includes a data base with the aforesaid information.

BRIEF DESCRIPTION OF THE DRAWINGS

The above and other features and aspects of the present invention will become more apparent upon reading the following detailed description in conjunction with the following drawings, in which.

DETAILED DESCRIPTION

Figure 1:
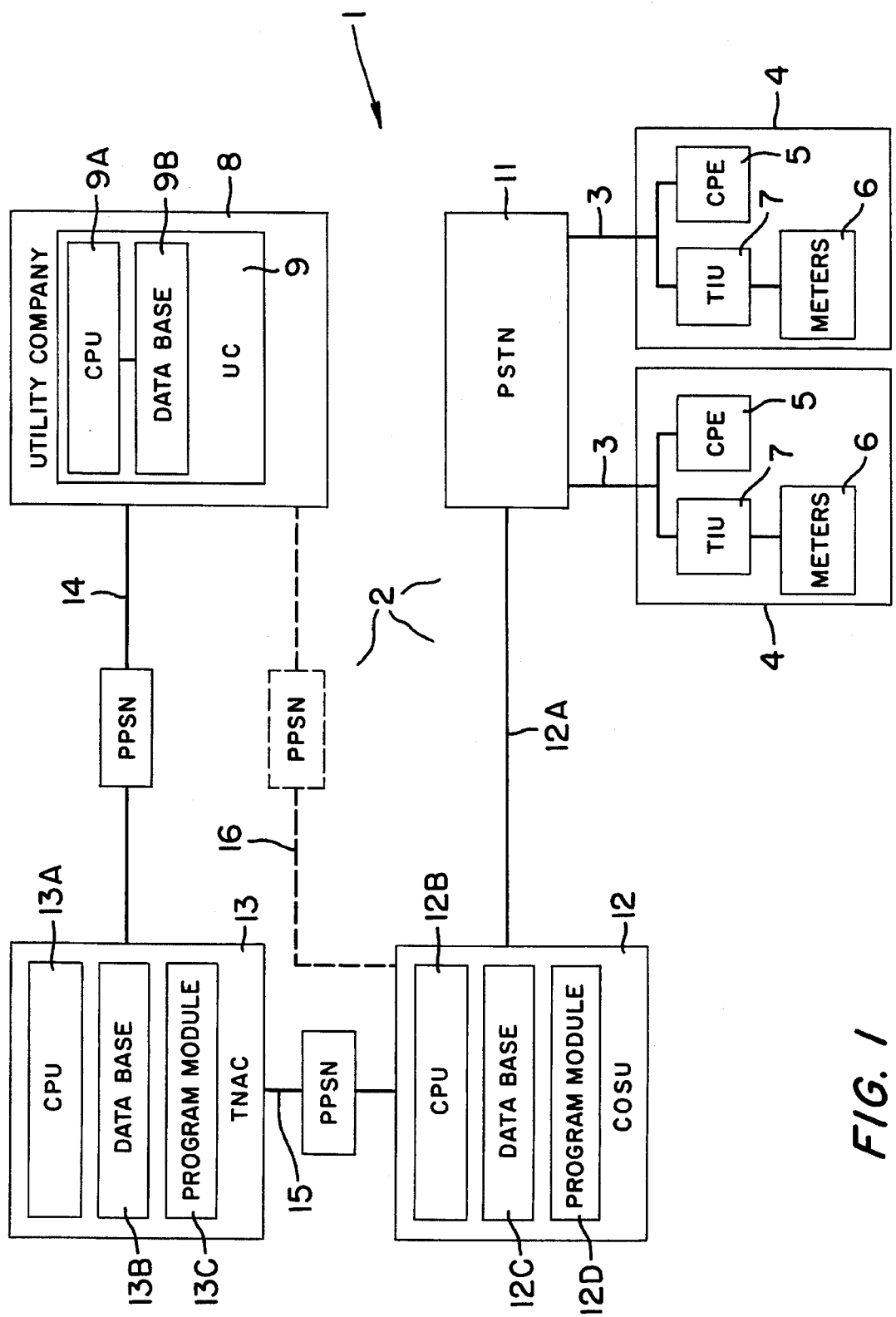
FIG. 1 shows a telemetry system in accordance with the principles of the present invention.

FIG. 1 shows a telemetry system 1 in accordance with the principles of the present invention. As shown, the telemetry system 1 comprises a telephone system 2 which provides telephone communication (e.g., voice path communication) over subscriber loops 3 to a plurality of subscriber locations 4 provided with customer premises or telephone equipment ("CPE") 5 (e.g. telephones, etc.).

The subscriber locations 4 also include equipment in the form of utility meters 6 which are to be accessed, monitored and/or controlled by the telemetry system. The utility meters 6 are accessed through TIUs 7 connected to the meters and the subscriber loop 3. The TIUs 7 and the meters 6 are associated with a utility company 8 having a utility computer ("UC") 9 which interfaces with and can form part of the telemetry system 1. The utility computer 9 includes a central processing unit ("CPU") 9A and a database 9B for storing read information and other information of the utility.

The telephone system 2 comprises a switching network, including a PSTN 11 and a COSU 12 connected to the PSTN 11 over associated trunks 12A. In one form of the invention, the telephone system 2 further includes a TNAC 13. The TNAC 13 interfaces with the UC 9 over a communication link 14 (e.g., a link in the public packet switched network of the system 2) and with the COSU 12 over a further communication link 15 (e.g., another link in the public packet switched network of the system 2).

As shown, the TNAC 13 includes a CPU 13A, a database 13B and a program routine module 13C. The TNAC 13 provides control of the COSU 12 so as to the permit access by the UC 9 through the switching network to the TIUs 7 at the subscriber locations 4 for reading, monitoring and controlling the utility meters 6. In the present illustrative case, TNAC 13 is adapted to provide such control in accordance with the teachings in the aforementioned '694 and '644 patents and the '031 patent application, all of which teachings are incorporated herein by reference.

Accordingly, the connections provided by the COSU 12 and its trunks 12A under the control of TNAC 13 are suppressed ringing connections which provide little or no ringing of the CPE 5 at the subscriber locations 4. In accordance with such suppressed ringing operation, when the UC 9 wishes to access a TIU 7 at a subscriber location 4, it passes over the link 14 to the TNAC 13 an access command message which includes the TIUID of the TIU 7 to be accessed. The TNAC 13, based on the TIUID in the access command message, retrieves from its database 13B current information pertaining to the TIUID, including the telephone number of the subscriber location (e.g., the telephone number of CPE 5 at the subscriber location), the TIU alert type or code (e.g., tone) for alerting the associated TIU, the TIU transmission type (e.g., modem transmission, telephone station transmission, etc.) for the associated TIU and a current signal code for the subscriber location loop 3.

The TNAC 13 then invokes its access routine in which, based on the retrieved telephone number of the subscriber location and the retrieved TIU alert and transmission types, the TNAC causes the COSU 12 to attempt to establish a suppressed ringing connection and transmit an alert message to the TIU 7 at the subscriber location using a predefined sequence of signal codes to establish the connection. This access routine results in an error signal at the TNAC 13 if no connection is made or if a connection is made and there is no match between the TIUID of the access message and the TIUID in the acknowledgement message sent by the alerted TIU 7.

If a successful connection is made and there is a match of the TIUIDs, the TNAC 13 sends a message to the UC 9 indicating that access to the desired TIU 7 has been effected. The UC 9 can then engage in a data session with the particular TIU 7 to read or control its associated utility meter 6.

In a second form of the invention, the above-described functions and operations of the TNAC 13 are carried out at the COSU 12 which, for this purpose, also includes a central processing unit 12B, a database 12C and program routine module 12D. In this case, the UC 9 is connected via a communication link 16 (e.g., a further link of the public packet switched network of telephone system 2) directly to the COSU 12 and interfaces with the COSU to gain access to the TIUs 7 and utility meters 6 in a similar manner as above discussed for the TNAC 13.

In accordance with the principles of the present invention, the telemetry system 1 is further adapted to permit installation of a TIU 7 at a subscriber location 4 easily and without the installer or the utility company 8 having to know the telephone number of the subscriber location. More particularly, this is accomplished by further adapting the telephone system 2 such that the dialing of a preselected telephone number at each of the subscriber locations 4 results in automatic identification of the telephone number of the subscriber location 4 (or CPE 5) and in initiating an automatic verification procedure for the TIU 7 being installed.

This is accomplished in the present illustrative case by including in the preselected telephone number a utility identifier and by using this identifier to acces a partial TIUID which is unique to the utility company 8 and is included in or is a part of the TIUIDs of the TIUs 7 used by the company. By then comparing this partial TIUID with the corresponding part of the TIUID received from an installed TIU 7, verification of the installation can be made. This verification, if desired, can be accompanied by an initial read of the utility meter 6 of the accessed TIU 7.

Specifically, the telephone system 2 is adapted such that dialing of the preselected telephone number at each of the subscriber locations 4 results in continuation of the call to the COSU 12 and delivering with the call the preselected telephone number and the automatically determined subscriber location telephone number. Upon receipt of the call and the telephone numbers, the COSU 12 transmits an acknowledgement message to the calling subscriber location 7 which is understood at the subscriber location as an instruction for the subscriber location to go on-hook. If the call has been made by the installer or by an installer computer, the acknowledgement message will be understood by the installer or computer and the subscriber location 4 will be placed on-hook.

Following receipt of the acknowledgment message, the subsequent operation of the system 1 will depend upon whether the TNAC 13 is employed to interface the COSU 12 with the UC 9 or whether the COSU 12 and UC 9 are directly interfaced. The operation of the system 1 for these two forms of the system 1 will be discussed in greater detail below in connection with FIGS. 2 and 3. However, an overall description of the system 1 which pertains to both cases will be given first.

After receipt of the acknowledgment message at the COSU 13, the utility identifier in the received preselected telephone number is used for or results in the retrieval of the partial TIUID for the utility company 8. In the present case, it is assumed that the partial TIUID is a common prefix used for the TIUIDs of the TIUs 7 and will be referred to hereinafter simply as the TIUID prefix. The utility identifier is also used for or results in the retrieval of a TIU transmission type and a TIU alert type associated with the identifier and the TIU 7 being installed.

Based on the automatically identified subscriber telephone number and the TIU transmission and alert types, the COSU 12 then attempts to establish a suppressed ringing connection to the subscriber location using a sequence of loop codes in each case followed by an alert message. In the event an alert message results in an acknowledgement message containing the TIUID of the TIU 7 at the called subscriber location 4, the procedure halts.

A part of the received TIUID, in the present case, the prefix of the TIUID, is then compared with the previously retrieved prefix TIUID. If a match occurs, then the installation of the TIU 7 is verified and the subscriber location is sent a confirmation message. This message is received at the subscriber location and recognized by the installer or installer computer monitoring the subscriber loop 3 for the confirmation message. This monitoring is initiated after the subscriber location is placed on-hook as instructed by the previous acknowledgment message from the COSU 12.

If an acknowledgement message is never received after a number of repetitions of the above sequence of attempted suppressed ring connections by the COSU 12, the verification procedure is aborted and no verification message is sent to the subscriber location. The failure to receive a confirmation message is recognized by the installer or installer computer, resulting in removal of the installed TIU 7.

As above indicated, the procedure for verifying the installation of a TIU 7 can be accompanied or be part of an access command for performing an initial read of the utility meter 6 at the subscriber location. In this case, if a verification is made, the read information is treated as valid and stored as an initial read.

Figure 2:
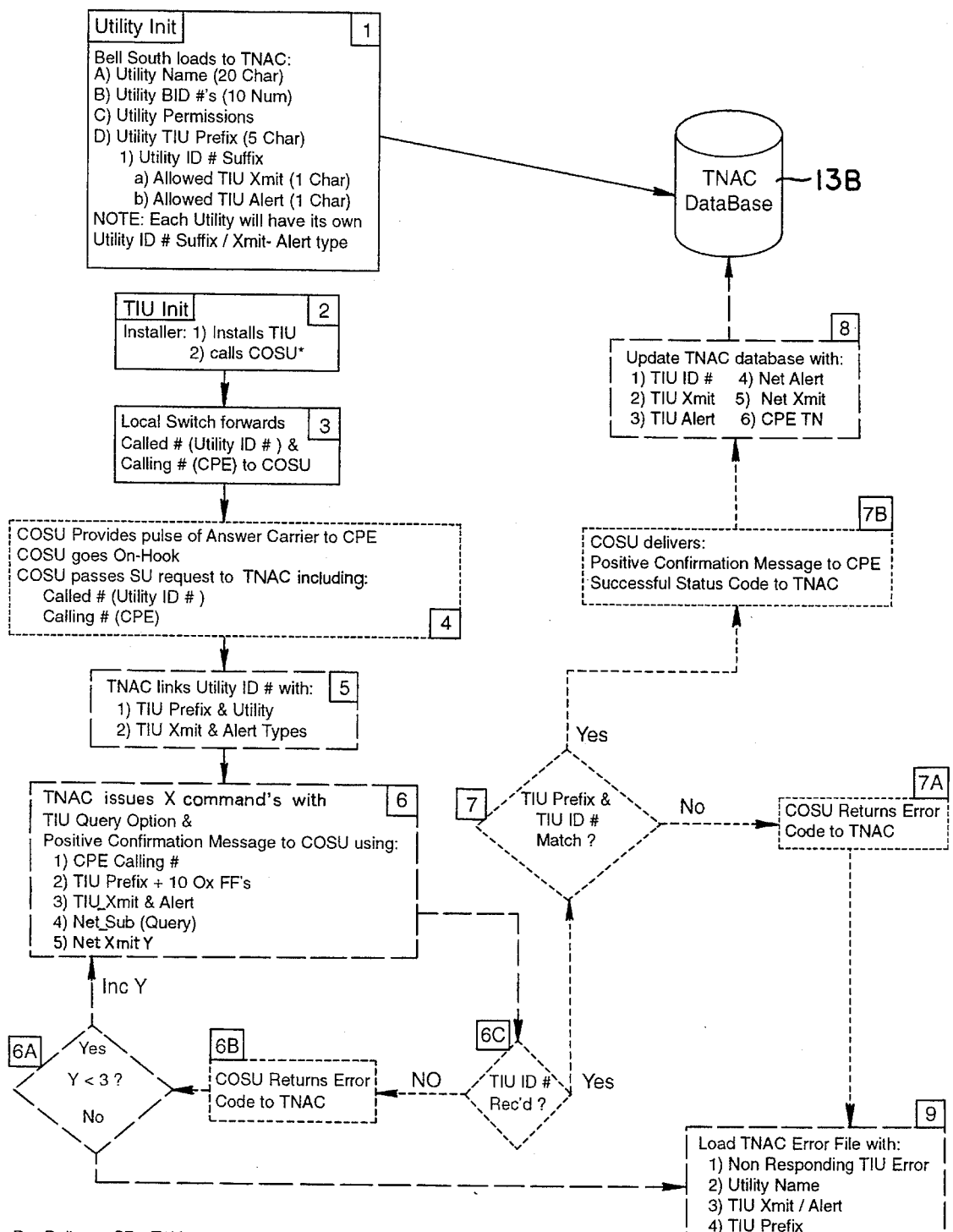
FIG. 2 shows the flow of operation of the system of FIG. 1 for the case in which a TNAC is used as the control computer in the system of FIG. 1.
Figure 3:
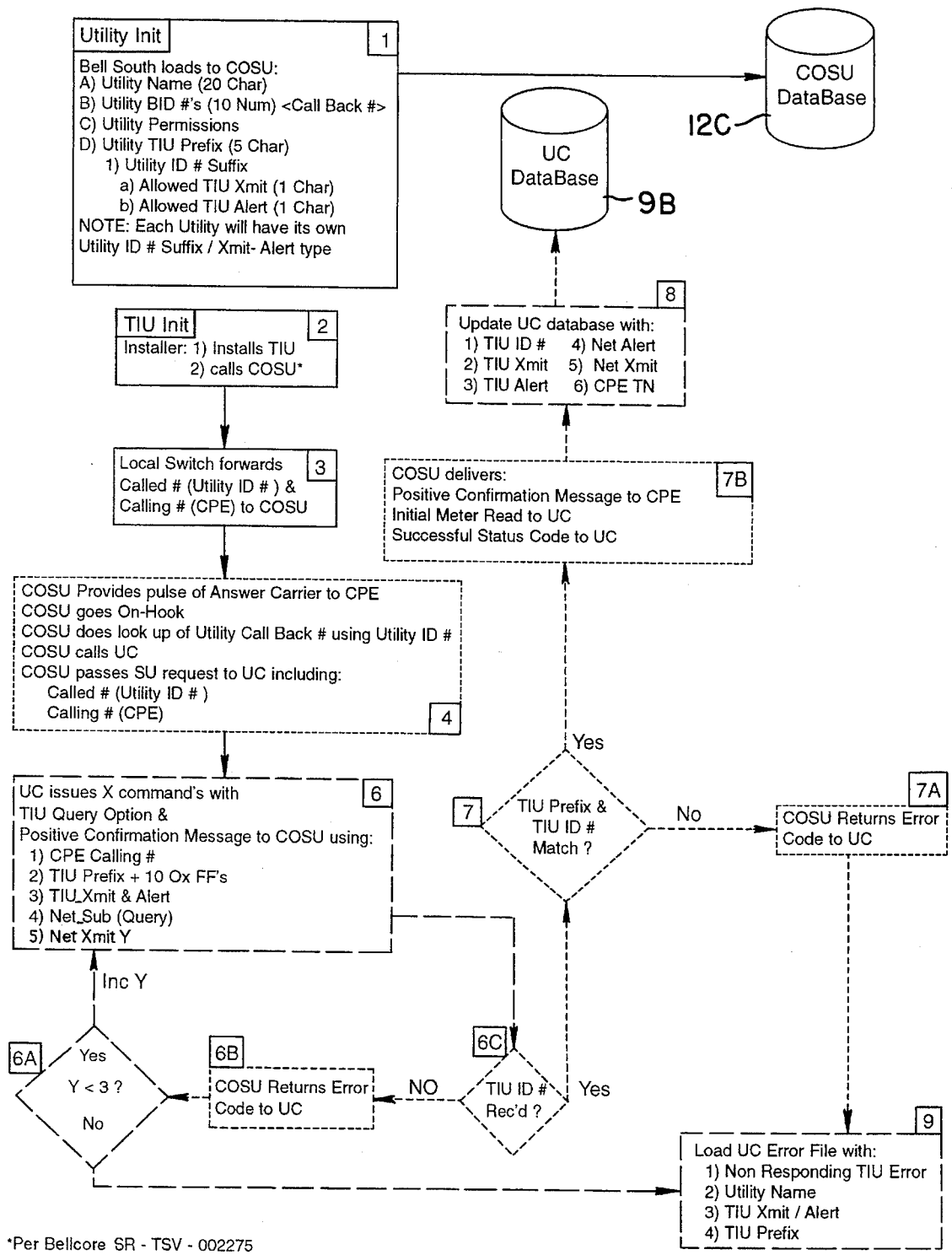
FIG. 3 shows the flow of operation of the system 1 for the case in which the computer of the monitoring entity is used as the control computer in the system of FIG. 1.

Having discussed the overall operation of the telemetry system 1, a more specific description of the two forms of the system will now be provided with reference to FIGS. 2 and 3. FIG. 2 depicts the system operation when the TNAC 13 is employed in the system. FIG. 3 depicts the operation when the TNAC is dispensed with. Each description is for one utility identifier, which is assigned and correlates to one TIUID prefix and one allowed TIU alert type and one allowed TIU transmission type.

A utility company may, of course, have several utility identifiers to accommodate different combinations of TIUID prefixes, TIU alert types and/or TIU transmission types of its TIUs 7, with each identifier corresponding to one TIUID prefix/TIU alert type/TIU transmission type combination. In such case, several preselected telephone numbers would be assigned the utility to accommodate the different combinations. Calls to these different numbers would be similarly processed as discussed herein.

Looking first at FIG. 2, the database 13B of TNAC 13 is first loaded in step 1 with information pertaining to the utility company 8. This information includes the utility identifier (shown as Utility ID # Suffix), the utility TIUID prefix (shown as TIU Prefix), the TIU alert type (shown as TIU Alert) and the TIU transmission type (shown as TIU Xmit).

In step 2, the installation of the TIU 7 is made by the installer at the subscriber location 4 and the installer then places a call using the preselected telephone number (shown as the Called # (Utility ID)). This results in the call being directed to the COSU 12 to institute a verification procedure (shown as a setup (SU) request).

As indicated in FIG. 2, the automatic continuation of the call to the COSU 12 and identification of the subscriber location telephone number can be effected over the PSTN 11 using either the so-called Feature Group D (10 XXX1+ Utility identification number) signalling or Feature Group B (19501 XXX) with ANI signalling. For feature Group D signalling, XXX is the switch routing identifier for the local COSU serving as the COSU 12 for the utility company 8.

For feature Group B, in which the COSU 12 for the utility company 8 is a COSU of an interexchange carrier, XXX is the utility company 8 identifier.

For Feature Group D signalling, one utility identifier per Local Access Transport Area would be associated with the one TIUID prefix, TIU alert type and TIU transmission type combination. For feature Group B, one XXX number would likewise be associated with one such combination on a per office basis. A more detailed explanation of the Feature Group B and D signalling is provided in Bellcore Standard SR TSV-002275.

In step 3, the PSTN 11 in continuing the call to the COSU 12, delivers to the COSU the preselected telephone number and the subscriber location telephone number. In step 4, the COSU 12 provides an acknowledgement signal (shown as Answer Carrier) to the subscriber location (shown as CPE). The COSU then goes on-hook and passes a verification request to the TNAC 13. This includes providing the TNAC with the preselected telephone number and the subscriber location telephone number.

In step 5, the TNAC 13 determines from its database 13B and the utility identifier in the preselected telephone number, the corresponding TIUID prefix and also the corresponding TIU transmission type and TIU alert type. The TNAC 13 in step 6 then invokes the verification procedure by transmitting a verification command (i.e., referred as X commands with TIU Query Option and positive confirmation message) to the COSU 12. This message includes the preselected telephone number, the subscriber location telephone number, the TIUID prefix and the TIU alert and transmission types and acts as a "query data exchange" call request to the COSU 12. As discussed below, it causes the COSU 12 in step 7 to compare the prefix TIUID with only the prefix of a TIUID received from a TIU 7, instead of with the entire TIUID, as would normally be the case.

More particularly, upon receipt of the verification command, the COSU 12 attempts a suppressed ringing connection to the subscriber location telephone number and in step 6C the COSU 12 waits for an acknowledgement message containing a TIUID. If none is received, the COSU 12 in step 6B returns an error message to the TNAC 13. The TNAC repeats the query message verification command and steps 6A and 6C are repeated. After three reported errors as determined in step 6A, the TNAC 13 halts the procedure and generates an error message, which in step 9 is recorded by the TNAC 13 and includes the utility company name, TIU alert and transmit types and the TIUID prefix.

If an acknowledgement message is received by the COSU 12 in the step 6C, the COSU 12 then in step 7 compares the prefix of the received TIUID with the TIUID prefix. If a match is not found, the COSU 12 in step 7A returns an error code to the TNAC 13 and the TNAC returns to step 9 to again create an error file.

If a match is found in step 7, the COSU 12 delivers a positive confirmation message to the subscriber location 4. This message may be a tone or data string and provides positive feedback to the installer as above-described to indicate a successful installation. The COSU 12 also delivers a message to the TNAC 13 in the form of a successful status code. The TNAC 13 then updates its database 13B with the TIUID, the subscriber location telephone number and other identifying information.

As above-indicated, FIG. 3 depicts operation of the system 1 without the TNAC 13 in the system and with the COSU 12 in direct communication with the UC 9. In this case, in step 1 the COSU database 12C is loaded with the utility information similarly to the loading of the TNAC database 13B in step 1 of FIG. 2. Also, in this case, installation of the TIU 7, the calling of the COSU 12 and the operation of the switching network in steps 2 and 3 are the same as in steps 2 and 3 of FIG. 2.

In step 3 in FIG. 3, the COSU 12, in response to the call to the preselected telephone number, provides an acknowledgment signal (shown as Answer Carrier) to the subscriber location and goes on-hook. The COSU 12 then, based upon the utility identifier in the preselected telephone number, looks up the UC 9 call back number and calls the UC 9. The COSU 12 passes to the UC 9, a verification request along with the preselected telephone number and the subscriber location telephone number. The UC 9 in step 6 then similarly to the TNAC operation in step 6 in FIG. 2, issues a verification command transmitting the same data to COSU 12.

The COSU 12 in steps 6A, 6B and 6C operates and interacts with the UC 9 similarly to its operation and interaction with the TNAC 13 in steps 6A, 6B and 6C in FIG. 2. In this case, if error messages are generated in each of three successive connection attempts invoked by the UC 9, the UC 9 in step 9 establishes an error file similar to the error file established by the TNAC 13 in step 9 in FIG. 2. In step 7, if no match is found with a received TIUID, the COSU 12 in step 7A returns an error to the UC 9 and the error step 9 is performed.

If a match is found in step 7, the COSU 12 returns a positive confirmation message to the subscriber location in step 7B similarly to the action taken by the COSU 12 in step 7B in FIG. 2. However, in this case, step 7B also causes an initial meter read to be sent to the UC 9 along with a success status code and TIU information, including the TIUID number and subscriber location telephone number. In step 8 the UC 9 updates its data base with this information.

It should be noted that in FIG. 1 the system 1 was illustrated as providing telemetry service to only one utility company 8. However, in accordance with the principles of the invention, the system 1 can also provide telemetry service to a plurality of utilities using different preselected telephone numbers. In such case, a preselected telephone number would include a utility identifier corresponding to a particular utility and the COSU and TNAC databases would link the utility information of the particular utility using the utility identifier. This identifier, since it is present in the preselected telephone number, would then permit the COSU and TNAC to which a call to the preselected telephone is directed to retrieve the utility information based on the identifier. Also, the different preselected telephone numbers with different utility identifiers of different utilities could be serviced by a one or more COSUs and/or TNACs interfacing with the different utility computers.

It should also be noted that a given utility might utilize groups of TIUs each group having TIUIDs whose prefixes differ. In such case, different utility identifiers and different preselected telephone numbers could be used for the different groups of TIUs to accommodate the different prefixes.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A telemetry system for monitoring entity equipment associated with a monitoring entity, said entity equipment being disposed at a subscriber location, comprising:

a telemetry interface unit disposed at the subscriber location for permitting access to said entity equipment at said subscriber location, the telemetry interface unit having a telemetry interface unit identifier;

a telephone system for providing telephone communication to said subscriber location, said telephone system further providing selective communication over said telephone system with said telemetry interface unit and being further adapted to automatically identify the telephone number of said subscriber location in response to a call from said subscriber location to a preselected telephone number and to undertake at least a part of a verification procedure for verifying installation of said telemetry interface unit at said subscriber location using said identified subscriber location telephone number.

2. A telemetry system in accordance with claim 1 wherein:

said preselected telephone number includes a monitoring entity identifier;

and said telephone system is adapted to undertake a verification procedure including: in response to receipt of said call to said preselected telephone number, transmitting an acknowledgement message to the subscriber location over the call connection of said call to instruct said subscriber location to go on-hook; using said identified subscriber location telephone number to establish a connection to the telemetry interface unit at the subscriber location and transmitting thereover a message to the telemetry interface unit at the subscriber location requesting transmission of the predetermined telemetry interface unit identifier of said telemetry interface unit; comparing a part of said telemetry interface unit identifier transmitted by said telemetry interface unit with a further telemetry interface unit identifier retrieved based on said monitoring entity identifier included in said preselected telephone number; and transmitting over said connection a confirmation signal to said subscriber location when said part of said transmitted telemetry interface unit identifier and said retrieved telemetry interface unit identifier match.

3. A telemetry a system in accordance with claim 2 wherein:

said part of said telemetry interface unit identifier is a prefix of said telemetry interface unit identifier.

4. A telemetry system in accordance with claim 2 wherein:

said telephone system is adapted to identify said preselected telephone number.

5. A telemetry system in accordance with claim 4 wherein:

said telemetry system correlates said monitoring entity identifier in said preselected telephone number with said further telemetry interface unit identifier.

6. A telemetry system in accordance with claim 5, wherein:

said telemetry interface unit has an alert type and a transmission type associated with said telemetry interface unit;

said telemetry system correlates said monitoring entity identifier in said preselected telephone number with said alert type and said transmission type;

and said telephone system uses said correlated transmission type and alert type to establish said connection to said telemetry interface unit at said subscriber location.

7. A telemetry system in accordance with claim 6 wherein:

said telemetry system further comprises a control computer connected to said telephone system; and said telephone system in response to said call to said preselected telephone number: communicates a verification request message to said control computer; awaits a verification command message from said control computer in response to said verification request message; and upon receipt of said verification command message undertakes said verification procedure.

8. A telemetry system in accordance with claim 7 wherein:

said verification command message is accompanied by an access command message; and said telephone system in response to said access command message requests said telemetry interface unit to conduct an initial read of said equipment which initial read is reported to said telephone system.

9. A telemetry system in accordance with claim 7 wherein:

said telephone system comprises: a switched telephone network; a central office service unlit connected to the switched telephone network and to said control computer; said switched telephone network being adapted to continue said call to said preselected telephone number to said central office service unit and to transmit to said central office service unit said identified preselected telephone and said identified subscriber location telephone number; and said central office service unit being adapted to control said switched telephone network and to communicate with said control computer to carry out said verification procedure.

10. A telemetry system in accordance with claim 9 wherein:

said central office service unit controls said switched telephone network such that a suppressed ringing connection is made over said switched telephone network to communicate with said telemetry interface unit.

11. A telemetry system in accordance with claim 10 wherein:

said telemetry interface unit has an alert type and a transmission type associated with said monitoring entity;

said telemetry system correlates said monitoring entity identifier in said preselected telephone number with said alert type and said transmission type;

and said telephone system uses said correlated transmission type and alert type to establish said connection to said telemetry interface unit at said subscriber location.

12. A telemetry system in accordance with claim 9 wherein:

said control computer is a computer of said entity and has a monitoring entity telephone number;

and said central office service unit correlates said monitoring entity identifier in said preselected telephone number with said monitoring entity telephone number.

13. A telemetry system in accordance with claim 12 wherein:

said entity is a utility;

and said equipment is a utility meter.

14. A telemetry system in accordance with claim 9 wherein:

said control computer is a telemetry network access computer included in said telephone system;

said central office service unit delivers said identified preselected telephone number and said identified subscriber location telephone to said control computer in transmitting said verification request message to said control computer;

and said control computer correlates said monitoring entity identifier in said preselected telephone number with said further telemetry interface unit identifier and transmits said further telemetry interface unit identifier to said central office service unit with said verification command message.

15. A telemetry system in accordance with claim 14 further comprising:

an entity computer communicating with said telemetry network access computer.

16. A telemetry system in accordance with claim 15 wherein:

said entity is a utility;

and said equipment is a utility meter.

17. A telemetry system in accordance with claim 2 wherein:

said telemetry system monitors entity equipment at a plurality of additional subscriber locations each including a telemetry interface unit, said telemetry interface unit at each additional subscriber location having a telemetry interface unit identifier, the telemetry interface unit identifiers of said telemetry interface units being different from each other;

said telephone system being adapted to undertake said verification procedure for the telemetry interface unit at each of said additional subscriber locations in the same manner as said telephone system undertakes said verification procedure for the telemetry interface unit at said subscriber location in response to a call from each said additional subscriber locations to said preselected telephone number; and the part of each of the telemetry interface unit identifiers which is used in said comparison in said verification procedure is the same.

18. A system for use in a telemetry system which monitors entity equipment associated with a monitoring entity located at a subscriber location, said subscriber location including a telemetry interface unit for permitting access to said entity equipment and having a telemetry interface unit identifier, said system comprising:

a telephone system for providing telephone communication to said subscriber location, said telephone system further providing selective communication over said telephone system with said telemetry interface unit and being further adapted to automatically identify the telephone number of said subscriber location in response to a call from said subscriber location to a preselected telephone number and to undertake at least a part of a verification procedure for verifying installation of said telemetry interface unit at said subscriber location using said identified subscriber location telephone number.

19. A system in accordance with claim 18 wherein:

said preselected telephone number includes a monitoring entity identifier;

and said telephone system is adapted to undertake a verification procedure including: in response to receipt of said call to said preselected telephone number, transmitting an acknowledgement message to the subscriber location over the call connection of said call to instruct said subscriber location to go on-hook; using said identified subscriber location telephone number to establish a connection to the telemetry interface unit at the subscriber location and transmitting thereover a message to the telemetry interface unit at the subscriber location requesting transmission of the predetermined telemetry interface unit identifier of said telemetry interface unit; comparing a part of said telemetry interface unit identifier transmitted by said telemetry interface unit with a further telemetry interface unit identifier retrieved based on said monitoring entity identifier included in said preselected telephone number; and transmitting over said connection a confirmation signal to said subscriber location when said part of said transmitted telemetry interface unit identifier and said retrieved telemetry interface unit identifier match.

20. A system in accordance with claim 19 wherein:

said part of said telemetry interface unit identifier is a prefix of said telemetry interface unit identifier.

21. A system in accordance with claim 19 Wherein:

said telephone system is adapted to identify said preselected telephone number.

22. A system in accordance with claim 21 wherein:

said system correlates said monitoring entity identifier in said preselected telephone number with said further telemetry interface unit identifier.

23. A system in accordance with claim 22, wherein:

said telemetry interface unit has an alert type and a transmission type associated with said telemetry interface unit;

said telemetry system correlates said monitoring entity identifier in said preselected telephone number with said alert type and said transmission type;

and said telephone system uses said correlated transmission type and alert type to establish said connection to said telemetry interface unit at said subscriber location.

24. A system in accordance with claim 23 wherein:

said system further comprises a control computer connected to said telephone system; and said telephone system in response to said call to said preselected telephone number: communicates a verification request message to said control computer; awaits a verification command message from said control computer in response to said verification request message; and upon receipt of said verification command message undertakes said verification procedure.

25. A system in accordance with claim 24 wherein:

said verification command message is accompanied by an access command message; and said telephone system in response to said access command message requests said telemetry interface unit to conduct an initial read of said equipment which initial read is reported to said telephone system.

26. A system in accordance with claim 24 wherein:

said telephone system comprises: a switched telephone network; a central office service unit connected to the switched telephone network and to said control computer; said switched telephone network being adapted to continue said call to said preselected telephone number to said central office service unit and to transmit to said central office service unit said identified preselected telephone and said identified subscriber location telephone number; and said central office service unit being adapted to control said switched telephone network and to communicate with said control computer to carry out said verification procedure.

27. A system in accordance with claim 26 wherein:

said central office service unit controls said switched telephone network such that a suppressed ringing connection is made over said switched telephone network to communicate with said telemetry interface unit.

28. A system in accordance with claim 27 wherein:

said telemetry interface unit has an alert type and a transmission type associated with said telemetry interface unit;

said system correlates said monitoring entity identifier in said preselected telephone number with said alert type and said transmission type;

and said telephone system uses said correlated transmission type and alert type to establish said connection to said telemetry interface unit at said subscriber location.

29. A system in accordance with claim 26 wherein:

said control computer is a computer of said entity and has a monitoring entity telephone number;

and said central office service unit correlates said monitoring entity identifier in said preselected telephone number with said monitoring entity telephone number.

30. A system in accordance with claim 29 wherein:

said entity is a utility;

and said equipment is a utility meter.

31. A system in accordance with claim 26 wherein:

said control computer is a telemetry network access computer included in said telephone system;

said central office service unit delivers said identified preselected telephone number and said identified subscriber location telephone to said control computer in transmitting said verification request message to said control computer;

and said control computer correlates said monitoring entity identifier in said preselected telephone number with said further telemetry interface unit identifier and transmits said further telemetry interface unit identifier to said central office service unit with said verification command message.

32. A system in accordance with claim 31 further comprising:

an entity computer communicating with said telemetry network access computer.

33. A telemetry system in accordance with claim 32 wherein:

said entity is a utility;

and said equipment is a utility meter.

34. A system in accordance with claim 19 wherein:

said telemetry system monitors entity equipment at a plurality of additional subscriber locations each including a telemetry interface unit, said telemetry interface unit at each additional subscriber location having a telemetry interface unit identifier, the telemetry interface unit identifiers of said telemetry interface units being different from each other;

said telephone system being adapted to undertake said verification procedure for the telemetry interface unit at each of said additional subscriber locations in the same manner as said telephone system undertakes said verification procedure for the telemetry interface unit at said subscriber location in response to a call from each said additional subscriber locations to said preselected telephone number; and the part of each of the telemetry interface unit identifiers which is used in said comparison in said verification procedure is the same.

35. A central office service unit of a telephone system of a telemetry system, the telemetry system monitoring entity equipment associated with a monitoring entity located at a subscriber location, said subscriber location including a telemetry interface unit for permitting access to said entity equipment and having a telemetry interface unit identifier, and said telephone system providing selective communication over said telephone system with said telemetry interface unit and being further adapted to automatically identify the telephone number of said subscriber location in response to a call from said subscriber location to a preselected number which includes a monitoring entity identifier, the central office service unit comprising means for undertaking at least a part of a verification procedure for verifying installation of said telemetry interface unit at said subscriber location using said identified subscriber location telephone number including:

means for receiving over said telephone system continuation of a call to said preselected number from said subscriber location including said identified subscriber telephone number and for transmitting an acknowledgement message to the subscriber location; means for using said identified subscriber location telephone number to initiate a call connection to the telemetry interface unit over said telephone network for transmitting a message to the telemetry interface unit at the subscriber location requesting transmission of the predetermined telemetry interface unit identifier of said telemetry interface unit; means for comparing a part of said telemetry interface unit identifier transmitted by said telemetry interface unit with a further telemetry interface unit identifier retrieved based on said monitoring entity identifier included in said preselected telephone number; and means for transmitting over said connection a confirmation signal to said subscriber location when said part of said transmitted telemetry interface unit identifier and said retrieved telemetry interface unit identifier match.

36. A method of verifying installation of a telemetry interface unit disposed at a subscriber location, the telemetry interface unit permitting access to entity equipment associated with a monitoring entity and having a telemetry interface unit identifier, the subscriber location being provided telephone communication over a telephone system which provides selective communication to the telemetry interface unit, the method comprising:

using said telephone system to automatically identify the telephone number of said subscriber location in response to a call to a preselected telephone number from said subscriber location; and further using said telephone system to undertake at least a part of a procedure for verifying installation of said telemetry interface unit at said subscriber location using said identified subscriber location telephone number.

37. A method in accordance with claim 36 wherein:

said preselected telephone number includes a monitoring entity identifier;

and said verification procedure includes: in response to receipt of said call to said preselected telephone number, transmitting an acknowledgement message to the subscriber location over the call connection of said call to instruct said subscriber location to go on-hook; using said identified subscriber location telephone number to establish a connection to the telemetry interface unit at the subscriber location and transmitting thereover a message to the telemetry interface unit at the subscriber location requesting transmission of the predetermined telemetry interface unit identifier of said telemetry interface unit; comparing a part of said telemetry interface unit identifier transmitted by said telemetry interface unit with a further telemetry interface unit identifier retrieved based on said monitoring entity identifier included in said preselected telephone number; and transmitting over said connection a confirmation signal to said subscriber location when said part of said transmitted telemetry interface unit identifier and said retrieved telemetry interface unit identifier match.

38. A method in accordance with claim 37 further comprising:

identifying said preselected telephone number.

39. A method in accordance with claim 38 wherein:

said verification procedure includes correlating said monitoring entity identifier in said preselected telephone number with said further telemetry interface unit identifier.

40. A method in accordance with claim 39 wherein:

said telemetry interface unit has an alert type and a transmission type associated with said telemetry interface unit;

and said verification procedure includes correlating said monitoring entity identifier in said preselected telephone number with said alert type and said transmission type and using said correlated alert type and transmission type to establish said connection to said telemetry interface unit at said subscriber location.

41. A method in accordance with claim 40 wherein:

said verification procedure further comprises: communicating a verification request message to a control computer; awaiting a verification command message from said control computer in response to said verification request message.

42. A method in accordance with claim 41 wherein:

said verification command message is accompanied by an access command message; and said method further comprises in response to said access command message requesting said telemetry interface unit to conduct an initial read of said equipment.

43. A method in accordance with claim 41 wherein:

said telephone system comprises: a switched telephone network; a central office service unit connected to the switched telephone network and to said control computer;

and said method further comprises: using said switched telephone network to continue said call to said preselected telephone number to said central office service unit and transmitting to said central office service unit said identified preselected telephone and said identified subscriber location telephone number; and using said central office service unit to control said switched telephone network and to communicate with said control computer to carry out said verification procedure.

44. A method in accordance with claim 43 wherein:

said switched telephone network is controlled by said central office service unit such that a suppressed ringing connection is made over said switched telephone network to communicate with said telemetry interface unit.

45. A method in accordance with claim 44 wherein:

said telemetry interface unit has an alert type and a transmission type associated with said telemetry interface unit;

and said verification procedure includes correlating said monitoring entity identifier in said preselected telephone number with said alert type and said transmission type and using said correlated alert type and transmission type to establish said connection to said telemetry interface unit at said subscriber location.

46. A method in accordance with claim 43 wherein:

said control computer is a computer of said entity and has a monitoring entity telephone number;

and said method further includes correlating in said central office service unit said monitoring entity identifier in said preselected telephone number with said monitoring entity telephone number.

47. A method in accordance with claim 46 wherein:

said entity is a utility;

and said equipment is a utility meter.

48. A method in accordance with claim 43 wherein:

said control computer is a telemetry network access computer included in said telephone system;

said method includes using said central office service unit to deliver said identified preselected telephone number and said identified subscriber location telephone to said control computer in transmitting said verification request message to said control computer; and correlating in said control computer said monitoring entity identifier in said preselected telephone number with said further telemetry interface unit identifier and transmitting said further telemetry interface unit identifier to said central office service unit with said verification command message.

49. A method in accordance with claim 48 wherein:

an entity computer communicates with said telemetry network access computer.

50. A method in accordance with claim 49 wherein:

said entity is a utility;

and said equipment is a utility meter.

51. A method in accordance with claim 37 wherein:

said telemetry system monitors entity equipment at a plurality of additional subscriber locations each including a telemetry interface unit, said telemetry interface unit at each additional subscriber location having a telemetry interface unit identifier, the telemetry interface unit identifiers of said telemetry interface units being different from each other;

said method further includes undertaking said verification procedure for the telemetry interface unit at each of said additional subscriber locations in the same manner as said verification procedure is undertaken for the telemetry interface unit at said subscriber location in response to a call from each of said additional subscriber locations to said preselected telephone number; and the part of each of the telemetry interface unit identifiers which is used in said comparison in said verification procedure is the same.

52. A method in accordance with claim 37 wherein:

said part of said telemetry interface unit identifier is a prefix of said telemetry interface unit identifier.

\* \* \* \* \*

UNITED STATES PATENT AND TRADEMARK OFFICE
CERTIFICATE OF CORRECTION

PATENT NO. :   5,535,267

DATED       :   July 9, 1996

INVENTOR(S):   Jerome W. Schull

It is certified that error appears in the above-identified patent and that said Letters Patent is hereby corrected as shown below:

Col. 5, line 22, change "acces" to -- access --.

Col. 10, line 19, change "unlit" to -- unit --.

Col. 12, line 14, change "Wherein" to -- wherein --.

Signed and Sealed this

Eighteenth Day of March, 1997

Attest:

BRUCE LEHMAN

Attesting Officer

Commissioner of Patents and Trademarks